T. F. HAMILTON, Dec'd,

E. A. and D. M. HAMILTON, executrixes, J. BOWERS & Co., assignees by mesne assignments.

CORSET.

No. 9,917. Reissued Nov. 1, 1881.

Witnesses:
Charles R. Bell
Chas. Herr

Assignees of Inventor:
James Bowers & Co.
by
O. Drake
Att'y

N. PETERS, Photo-Lithographer, Washington, D. C.

UNITED STATES PATENT OFFICE.

JAMES BOWERS & CO., OF NEWARK, NEW JERSEY, ASSIGNEES, BY MESNE ASSIGNMENTS, OF ELIZA A. HAMILTON AND DELIA M. HAMILTON, EXECUTRIXES OF THOMAS F. HAMILTON, DECEASED.

CORSET.

SPECIFICATION forming part of Reissued Letters Patent No. 9,917, dated November 1, 1881.

Original No. 136,320, dated February 25, 1873. Application for reissue filed December 7, 1880.

*To all whom it may concern:*

Be it known that THOMAS F. HAMILTON, of New Haven, in the county of New Haven and State of Connecticut, has invented a new and useful Improvement in Corsets; and we do hereby declare the following, when taken in connection with the drawings and the letters of reference marked thereon, to be a full, clear, and exact description of the same, and which said drawings constitute part of this specification, and represent, in—

Figure 1:
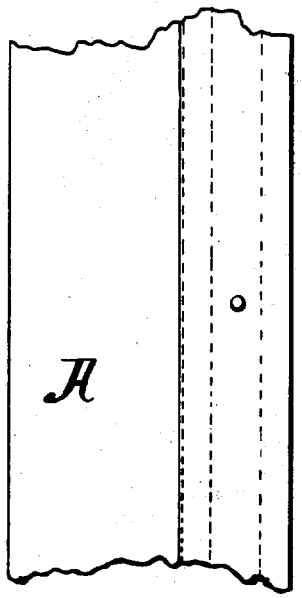
Figure 2:
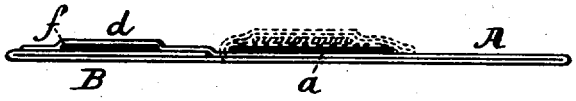

Figure 1, a front view of a portion of one edge of a corset, and in Fig. 2 a transverse section.

This invention relates to an improvement in the manner of finishing the edge and inserting the steels or busks of corsets; and it consists in the arrangement of an auxiliary spring or busk in an independent pocket, in connection with the steel or busk pocket proper, as hereinafter set forth and claimed.

In carrying out the invention the corset-body A is made sufficiently wide that a portion, B, may be turned over to cover the steel *a*, as denoted in broken lines, and form a pocket therefor, the edge of said portion B being stitched to the body proper. Over the portion B an additional portion or strip, *d*, of fabric is placed and stitched thereto, so as to form a pocket for the reception of the auxiliary steel *f*. This stitching is done before the folding over of the portion B to form the pocket for the steel *a*, and when the whole is completed and the steels *a* and *f* are introduced into their pockets a portion of the fabric will lie between the steel *a* proper and the auxiliary steel *f*, as denoted in broken lines, Fig. 2.

By this construction we are enabled to use a light steel, as the auxiliary steel adds the required elasticity and strength, and the two thus combined are less liable to break than a single steel of the required strength; and in case the spring or steel breaks, that portion only must be removed; whereas in double steels, if one breaks, the whole is destroyed.

It is immaterial whether the pocket for the auxiliary spring be upon the outer or inner surface.

We claim—

1. In a corset, the combination, with a pocket for the steel or busk proper, of a second or independent pocket for the reception of an auxiliary steel or busk, arranged so as to lie upon the aforesaid pocket of the steel proper, substantially as and for the purposes set forth.

2. In a corset, the combination of two independent pockets arranged face to face with each other for the reception of busks, for the purposes set forth.

JAS. BOWERS & CO.,
By THOS. W. JACKSON,
*A member of the firm.*

Witnesses:
CHARLES H. PELL,
OLIVER DRAKE.